United States Patent [19]

Smith

[11] Patent Number: 4,854,507

[45] Date of Patent: Aug. 8, 1989

[54] METHOD AND APPARATUS FOR CONDITIONING THE LITTER ON THE FLOOR OF A POULTRY REARING FACILITY

[76] Inventor: Gordon Smith, Rte. 3, Box 134, Hope, Ark. 71801

[21] Appl. No.: 255,265

[22] Filed: Oct. 11, 1988

[51] Int. Cl.⁴ .......................................... B02C 21/02
[52] U.S. Cl. ................................. 241/27; 241/101.7; 241/189 R; 241/194
[58] Field of Search ............... 119/22, 27, 28; 299/36; 404/91; 241/101.7, 27, 189 R, 30, 190, 194, 285 B, 191

[56] References Cited

U.S. PATENT DOCUMENTS

| | | | |
|---|---|---|---|
| 1,713,957 | 5/1929 | Duvall | 241/194 X |
| 2,663,555 | 12/1953 | Milliken . | |
| 2,768,794 | 10/1956 | Putnam . | |
| 3,084,942 | 4/1963 | Kucera | 241/189 R X |
| 3,263,257 | 8/1966 | Stapleton, Sr. . | |
| 3,826,436 | 7/1974 | Cetrulo . | |
| 3,850,375 | 11/1974 | Ford | 241/189 R X |
| 3,881,707 | 5/1975 | Toto . | |
| 4,052,011 | 10/1977 | Burkhart et al. . | |
| 4,619,412 | 10/1986 | Willingham . | |
| 4,708,294 | 11/1987 | Endom . | |

Primary Examiner—Mark Rosenbaum
Attorney, Agent, or Firm—Hill, Van Santen, Steadman & Simpson

[57] ABSTRACT

An apparatus for reconditioning the floor of a poultry rearing area includes a housing and frame adapted to be attached to a three-point hitch of a tractor so that the device is propelled and powered by the tractor. The device further includes a rotating shaft having a plurality of flail elements comprising straight bar members of 10 inches or longer are pivotally attached about the circumference of a rotating shaft for pulverizing poultry litter by rotating closely adjacent a contoured bed in the housing shaped to have an arcuate shape following the arc scribed by the swing of the flail elements through at least 40° of arc. A hinged top cover permits access to the flail elements and rotating shaft and a hinged rear deflector forms with the contoured bed and outlet that ensures that the reconditioned litter is deposited evenly on the floor. Further, a sprocket and chain assembly used to power the rotating shaft is interposed between an angle gear box attached to the power take-off of a tractor and the rotating shaft so that the strain of the rotating shaft is not directed on the angle gear box.

18 Claims, 2 Drawing Sheets

METHOD AND APPARATUS FOR CONDITIONING THE LITTER ON THE FLOOR OF A POULTRY REARING FACILITY

BACKGROUND OF THE INVENTION

1. Field of the Invention

The present invention relates generally to a method and apparatus for conditioning the floor of a poultry rearing facility for reuse, and more specifically, a method and apparatus for disintegrating caked and compacted material covering the floor, so-called poultry litter, following the grow-out of a flock of poultry broilers.

2. Discussion of the Related Art

In the rearing of poultry, particularly broiler chickens, the poultry are generally housed in shelters having a roof and a floor formed of compacted and leveled earth including a covering of material, e.g., an organic material such as wood sawdust, wood shavings, or rice hulls. The floor covering material is provided to absorb dropping and moisture and to insulate small chicks from cold and dampness of a bare floor. The shelters can typically be 650 feet long and 40 feet wide.

Such shelters, especially in the southern states where below freezing temperatures are rare, typically have open sides. It is customary to provide such shelters with roll-down curtains to cover the open sides, especially when there is rain accompanied by wind, to both protect the poultry and to prevent excessive wetting of the floor of the rearing area.

The floor covering material typically has a depth of perhaps several inches. Of the various organic materials used in the past, sawdust is found to be the most satisfactory because of its ability to absorb moisture from the poultry droppings, thereby causing them to dry reasonably quickly, and because it also has the ability to surface dry quite quickly if the sawdust becomes wet from rain or spilled drinking water. Another reason for using sawdust is that the sawdust provides a relatively soft cover on the earth floor and can be scraped from the floor to clean the chicken house.

After several weeks, usually seven to eight weeks, as the grow-out of the poultry progresses, the organic floor covering material becomes caked and compacted with droppings and other moisture. This caked material, so-called poultry litter, must be eliminated or reconditioned so that the floor can be reused for another flock of poultry.

In the past, when sawdust was inexpensive and available, the sawdust and caked droppings would be scraped off, for example, with a bulldozer-type scraper blade and the scraped material would simply be pushed to one end of the chicken rearing area and hauled away, and a new layer of fresh sawdust was then spread on the floor. However, sawdust is now quite expensive and frequently unavailable because of its extensive use in the manufacture of other items. Moreover, disposal of the litter can be inconvenient if the disposal sites are removed from the poultry rearing area. Accordingly, the previous technique of simply scraping the spent litter from the floor together with the droppings is no longer economical, and is frequently not possible because of the unavailability of replacement sawdust.

Instead of simply scraping the sawdust from the floor, a variety of devices have been designed for reconditioning the organic floor covering material for reuse. In order for the material to air out and dry out, the caked and moist material must be pulverized and thoroughly mixed and fluffed to allow air to circulate through and around it to remove moisture and ammonia.

U.S. Pat. No. 4,619,412 discloses a tractor-drawn machine that reduces the hardened layer of litter or organic floor covering material on the floor of a poultry house to a somewhat pulverized state so that it may be reused on the floor. A leading scraper blade of the machine slightly elevates the hardened litter layer and as the hardened litter layer traverses grid plates immediately behind the scraper blade, it is acted upon by rotating flail hammers having chopping heads. The somewhat pulverized material is discharged at the rear of the traveling machine and is deposited back onto the floor of the poultry house.

U.S. Pat. No. 4,708,294 discloses another device having a frame adapted to be moved along the floor to be conditioned including a scraper blade that scrapes litter from the floor into the path of a power driven rotary pulverizer having 29 hammers pivotally connected about a 60 inch drum for pivotal movement circumferentially of the drum. In addition, the hammer elements have flat heads.

In both of the disclosed devices, the litter falls to the floor after its first contact with the rotating hammer elements. Because of this, the litter has a tendency to break off in large chunks, thereby requiring several passes by the reconditioning devices disclosed. Additionally, because the hammers disclosed have flat heads, the hammer elements tend to cake up and require cleaning.

Further, the hammers of the commercial embodiment of U.S. Pat. No. 4,708,294 are only five inches long. After several flocks of poultry have been raised, the litter can reach a depth of up to six inches. This depth cannot be handled by the machine with only five inch long hammers.

SUMMARY OF THE INVENTION

The present invention provides a method and device for conditioning the floor of a poultry rearing area for reuse, wherein the entire depth of the floor covering material or poultry litter can be thoroughly pulverized, mixed, and fluffed, and wherein flail elements used to pulverize the poultry litter do not require cleaning. To this end, there is provided a conditioner device adapted to be powered and propelled by a tractor that includes a frame and housing adapted to be moved over the floor of a poultry rearing area having a scraper blade for lifting up organic floor covering material or poultry litter, and a plurality of flail elements that are pivotally connected about a rotatable shaft for pivotal movement circumferentially of the shaft.

In one embodiment, a contoured floor panel is positioned beneath the flail elements and has an arcuate surface of about 40 degrees that keeps the organic material or poultry litter in close contact with the rotating flail elements for a sufficient period to ensure thorough pulverizing and mixing of the material before it falls back to the floor. The flail elements are about 10 inches long or longer and thus, can accommodate deep layers of poultry litter. Moreover, the flail elements are straight bar members having no extra flat heads and these are self-cleaning because the material does not stick to them.

In the preferred embodiment, the cnnditioner device includes 54 flail elements on a 48 inch long drum member. This close or tight placement of the flail members enhances the pulverizing action.

In yet another embodiment, the conditioner device includes an angle raker element that enables the device to get much closer to the edge of buildings which have vertical supports obstructing a straight path. The angle raker element brings material from the perimeter of the floor into the device and enables the device to give more complete coverage.

In a further embodiment, the conditioner device includes a roller chain and sprocket assembly for driving the rotatable shaft. The roller chain and sprocket assembly includes a gear box adapted for connection to the tractor power take-off. The roller chain of the assembly connects between a sprocket connected to the gear box and a sprocket on the shaft. The gear box preferably is rated at 50 hp.

In yet a further embodiment, the conditioner device includes a hinged top cover positioned at a top section of the housing to permit access to the shaft and flail elements. Additionally, the housing includes a deflector panel hingedly attached at a discharge end of the device to evenly distribute the discharged or reconditioned organic material on the floor.

DETAILED DESCRIPTION OF THE PREFERRED EMBODIMENTS

Figure 1:
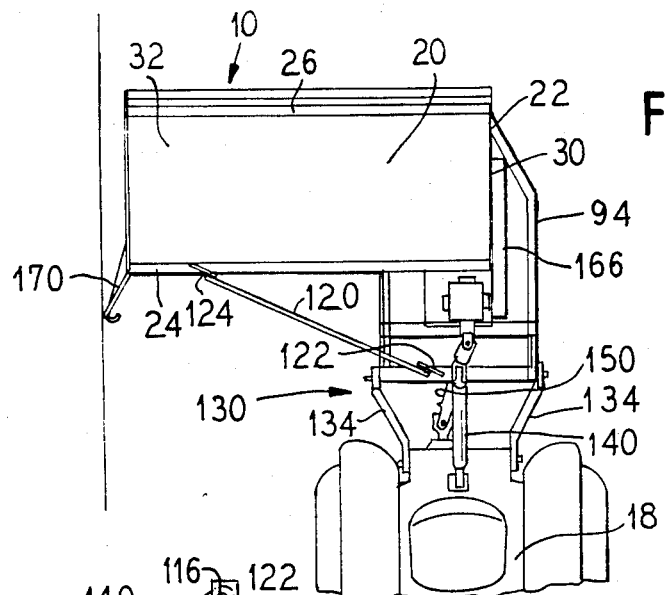
FIG. 1 is a top view of a device embodying principles of the invention illustrating the connection of the device to a tractor for pulling same.
Figure 2:
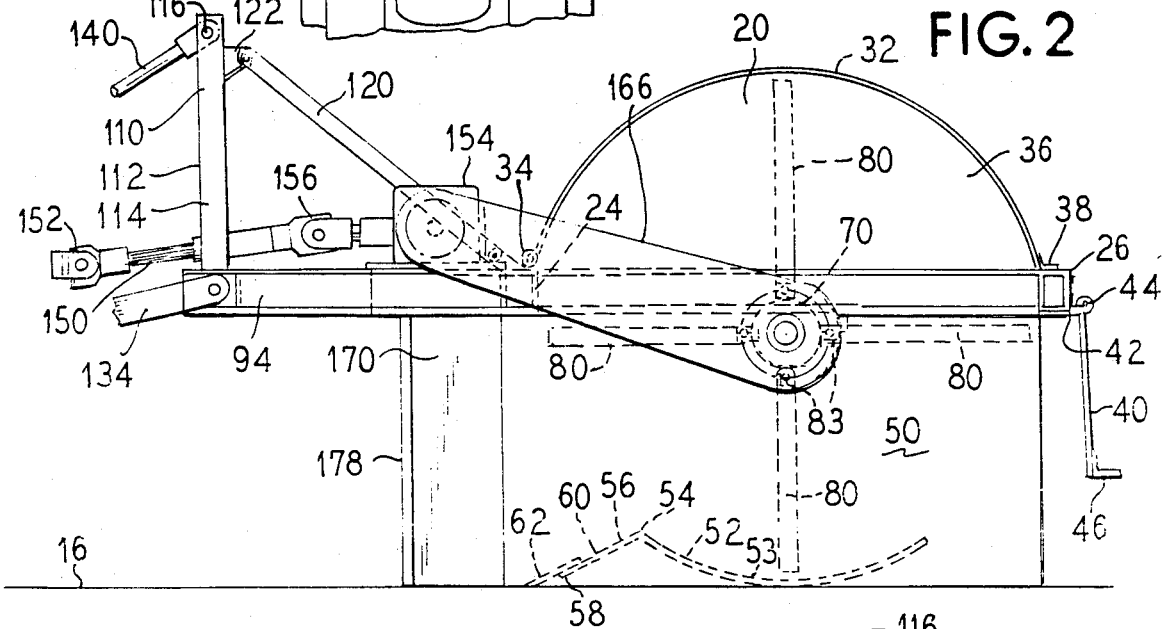
FIG. 2 is an elevational view of the device of FIG. 1.
Figure 3:
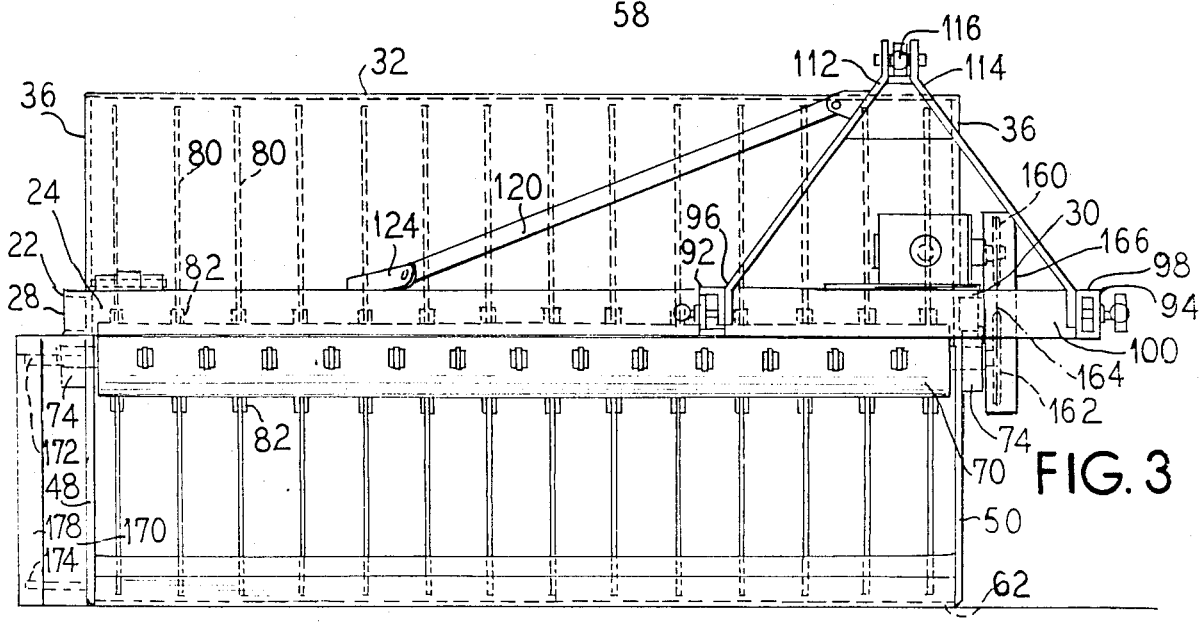
FIG. 3 is a front view of the device of FIG. 1.
Figure 4:
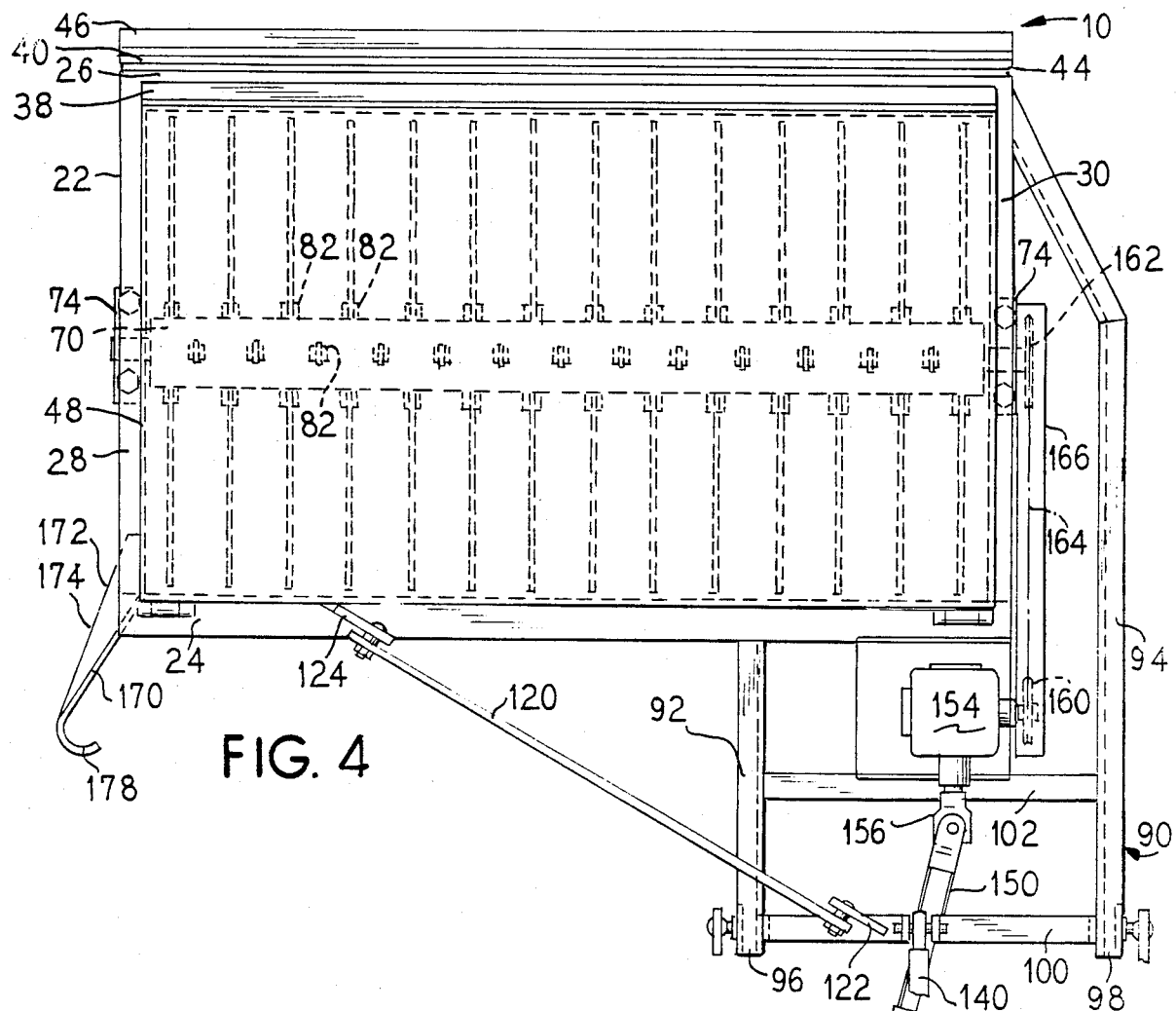
FIG. 4 is a plan view of the device of FIG. 1.
Figure 5:
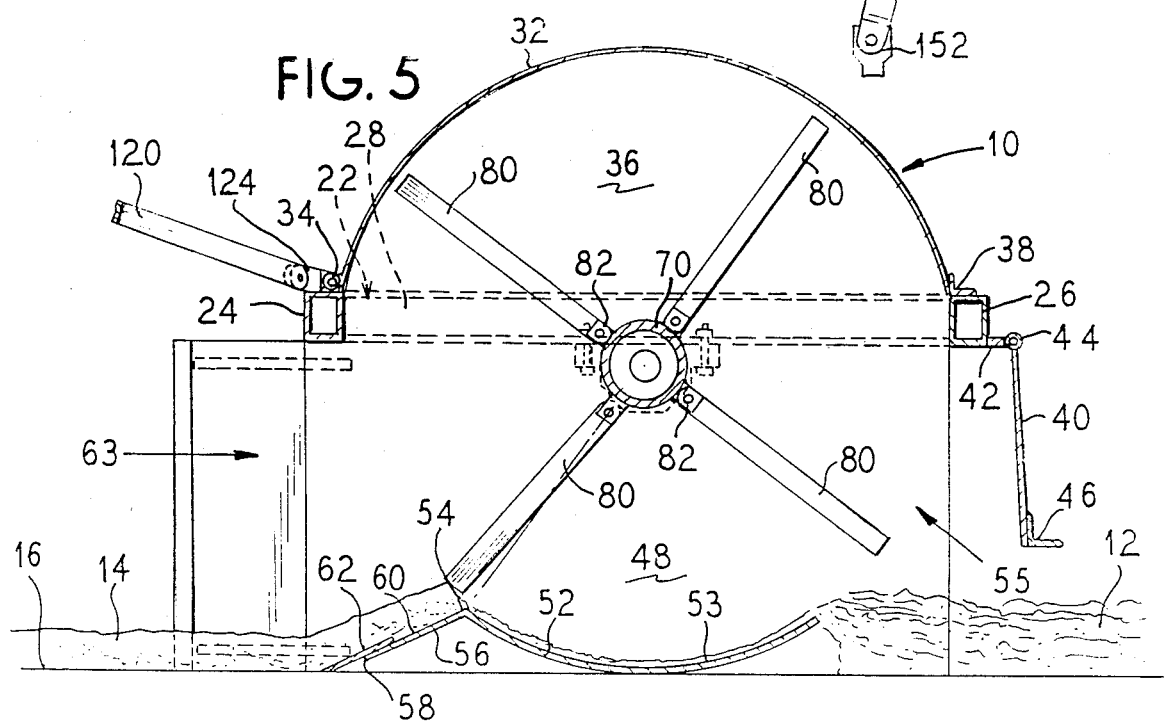
FIG. 5 is a cross-sectional view of the device of FIG. 1 taken along the line V—V of FIG. 4.

As illustrated in FIGS. 1 and 5, the present invention provides a conditioner device 10 for producing a layer 12 of reconditioned organic material from a layer 14 of caked organic material covering a floor 16 of a poultry rearing area, the so-called poultry litter layer. The device 10 is adapted to be propelled and powered by a tractor 18.

For the remainder of this description, reference should be made to all of the drawings.

The device 10 includes a housing 20 mounted and supported on a frame 22. The frame 22 includes a front transverse frame bar member 24 and a rear transverse frame bar member 26 located at front and rear portions of the housing 20, respectively. The frame 22 further includes left longitudinal frame bar member 28 and right longitudinal frame bar member 30 located on left and right sides of the housing 20, respectively.

The housing 20 includes a semi-cylindrical top cover 32 hingedly attached to the forward transverse frame bar member 24 by means of a hinge 34. The top cover 32 preferably is made of heavy sheet metal. The top cover 32 includes two semi-circular end walls 36. The top cover 32 is secured in a closed position by means of a latch member 38.

The semi-cylindrical top cover 32 seves at least three functions. First, the top cover 32 protects an operator from flying material or objects being subjected to the pulverizing and mixing actions of the device 10. Second, the semi-cylindrical shape helps control distribution of the material during mixing and discharge. Third, the hinged attachment permits the top cover 32 to be opened to permit easier inspection of the interior of the device 10.

The housing 20 also includes a vertical deflector panel member 40 hingedly attached along a bottom edge 42 of the rear transverse frame bar member 26 by means of a hinge 44. An L-0254 shaped flange member 46 located on the free end of the deflector panel member 40 serves to weigh down the deflector panel member 40 to maintain same in a downwardly depending position and to provide an edge for easy grasping.

The deflector panel member 40 serves to deflect reconditioned floor covering material as it is discharged from the conditioner device 10. The pulverized and mixed floor covering material is discharged against the deflector panel member 40 which then causes the material to be deflected downward onto the floor 16 and to be distributed evenly thereon. The deflector panel member 40 is longer than similar panels of prior art devices and this extra length, together with the hinged attachment at 44, enables the device 10 to be operated in areas having layers of material to be conditioned of greater depths, should there ever arise the need to raise the conditioner device 10 during operation.

The housing 20 further includes left and right bottom end walls 48 and 50, respectively, attached to the left and right longitudinal frame bar members 20 and 22, respectively.

Attached to bottom edges of the left and right end walls 48 and 50, is a contoured bed or floor panel 52. The contoured bed or floor panel 52 has a concave or arcuate section 53 having an arcuate length of approximately 40 degrees. At a front end 54 of the contoured section 53, there is formed a forwardly slanting support plate member 56 that also extends between the left and right end walls 48 and 50, respectively. As illustrated, the foremost edge 58 of the support plate member 56, does not touch the floor 16 or reach down to the level thereof. Instead, the foremost edge 58 is slightly raised above the floor 16.

Attached along a topside 60 of the support plate member 56 is a scraper blade member or element 62 that also extends transversely between the left and right end walls 48 and 50. The leading edge of the scraper blade member 62 extends down to the elevation of the floor 16 to ensure that all of the organic material forming the compacted layer 14 is scraped off of or scooped up from the floor 16 and directed into the device 10 through the opening 63 to the concave or arcuate section 53.

Attached beneath each wall 48 and 50 is a longitudinally positioned steel bar with a minimum of 64 square inches of floatation surface bearing on the floor 16. These bars serve as a positive measure to prevent damage to the floor 16 as well as excessive wear on the scraper blade member.

Also supported from the left and right longitudinal frame bar members 28 and 30, is a rotatable shaft or drum 70. The rotating shaft or drum 70 is supported within roller bearings, not shown, that are supported from the frame bar members 28 and 30 by sealed roller bearing pillow blocks 74. The ends of the drum or shaft 70 extend through appropriately formed openings in the end walls 48 and 50.

Attached along the rotatable drum or shaft 70 are a plurality of flail elements 80. The flail elements 80 are pivotally attached to the drum or shaft 70 by means of anchor bracket members or lugs 82 attached along the drum or shaft 70. The anchor bracket members or lugs 82 are equally spaced on the drum or shaft 70 in four rows positioned at 90 degree intervals and such that each successive row of anchor bracket members or lugs 82 is offset by half the distance between any two lugs 82 of the previous or following rows so that contact between flail elements 80 is avoided. The anchor bracket members or lugs 82 are appropriately attached to the drum by means of welding and the like and the flail elements 80 are attached to the lugs 82 by means of pins 83.

The flail elements 80 are formed of straight steel bars. Each bar has a length of about 10 inches or greater. Each bar has a width of about ⅜ inches. Each flail element 80 is secured to an anchor bracket member or lug 82 by means of a pin 83 that comprises a grade 5 bolt and a nut. Each pin 83 is replaced whenever an inspection reveals a sufficient degree of wear.

It can be appreciated that as the rotatable drum or shaft 70 is caused to rotate, the flail elements 80 will rotate or swing therewith. As the flail elements 80 are rotated or swung, they experience centrifugal forces and extend radially from the drum or shaft 70. The extended and swinging flail elements serves as a disintegrator to disintegrate or otherwise pulverize and mix the material 14 to recondition same. Additionally, the flail elements 80 cause the reconditioned material to be fluffed or fluffy. This fluffing action is not disclosed in the prior art devices.

The concave or arcuate section 53 of the contoured floor panel 52 brings the material to be conditioned into positive contact with the flail elements 80 to ensure greater pulverizing action. Moreover, the concave section 53 ensures that the material is not immediately discharged out through opening 55 after only one contact with the flail elements 80, thereby preventing the discharge of large chunks of material as is the experience with prior art devices discussed above. Thus, the material is retained within the device 10 for a sufficient length of time until it is thoroughly pulverized and mixed.

The density and placement of the flail elements 80 along the drum or shaft 70 is chosen so that all of the material 14 to be reconditioned is exposed to the pulverizing action of the flail elements 80. Thus, in the preferred embodiment, there are 54 such flail elements 80 positioned along a drum or shaft having a length of 48 inches.

The device 10 further includes a hitch assembly 90 including a left longitudinal hitch assembly frame bar 92 and a right longitudinal hitch assembly frame bar 94. Extending between front ends 96 and 98 of the left and right frame bars 92 and 94, respectively, is a front transverse hitch assembly bar 100. Also located between the left and right frame bars 92 and 94, is a hitch assembly bracing bar 102. The bars 100 and 102 serve to give the hitch assembly 90 rigidity and to maintain the left and right longitudinal hitch assembly frame bars 92 and 94 in spaced apart relation.

The hitch assembly 90 further includes a coupling yoke 110 having upstanding bars 112 and 114, that are attached to and angled from the front ends 96 and 98 of the left and right hitch assembly longitudinal bars 92 and 94, respectively, toward a center point along the hitch assembly front end transversal bar 100. The coupling yoke 110 is braced by a bracing bar member 120 that extends between the upright bar member 112 and the front transversal frame bar member 24. The bracing member 120 is attached at one end to a lug or anchor bracket member 122 located on the upstanding bar member 112 and a lug or anchor bracket member 124 attached to the front transversal frame bar member 24.

The coupling yoke and front end portions 96 and 98 form a three-point hitch 130 that is attached to the tractor 18 in an appropriate manner. Lift arms 134 attached at opposite sides of a back end 136 of the tractor 14 are attached at opposite ball joint ends 101 of the hitch assembly front end transversal bar 100. An extendable link or hydraulic cylinder 140 extends between a topside 142 of the back end 136 of the tractor 14 and a connecting point 116 of the coupling yoke 110. The device 10 is bodily carried by the tractor 14 on the three-point hitch 130 and can be raised and lowered relative to the floor 16 by means of the extendable link or cylinder 140, as required. Further, the extendable link or cylinder 140 is used to level the device 10 from front to rear.

A power take-off tumbler bar 150 extends between a power take-off connection 152 and a universal connection 156 extending from a right angle gear box 154. The gear box universal connection 156 is operatively connected through gears, not illustrated, to a sprocket 160 of a roller chain and sprocket assembly. Another sprocket 162 is operatively connected to the rotating drum or shaft 70. A chain extends between the sprocket 160 and the sprocket 162 so that the rotating drum is driven by the power take-off of the tractor 14. A drive chain cover 166 covers the moving sprockets 160 and 162 and the chain 164 so as to protect operators from the moving parts.

The power take-off power is transmitted to the rotating drum or shaft 70 through the tumbler bar 150 to the right angle gear box 154 which is industry rated at 50 hp. The power is then transmitted from the right angled gear box 154 to the roller chain and sprocket drive and then to the rotating drum or shaft 70. The roller chain and sprocket assembly provides for an inexpensive means of changing the drive ratio as well as eliminating a longer tumbler bar. Further, the roller chain and sprocket assembly places the load of the rotating drum or shaft 70 on the sealed roller bearing pillow blocks 74 instead of the output shaft of the relatively expensive right angled gear box 154.

Finally, attached to the left end wall 48 is an angle raker 170 that directs material near the perimeter of a wall into the device 10. The angle raker 170 enables the device 10 to get much closer to the edge of buildings which have vertical supports obstructing a straight path. The angle raker 170 is appropriately attached to the end wall 48 by means of a pair of ribs 172 and 174 that are welded or otherwise attached to the angle raker 170 and end wall 48. Furthermore, the angle raker 170 is provided with an additional curved bar 178 that is turned inward to prevent hanging on the vertical walls of nearby structures.

Operation

In operation, the conditioner device 10 is attached to the three-point hitch of the tractor 18 and the tractor power take-off 152 is connected to the tumbler bar 150. The extendable link or cylinder 140 is then operated to raise the conditioner device 10 so that it can be carried to the poultry rearing area.

Once in the poultry rearing area, the conditioner device 10 is lowered by extending the extendable link or cylinder 140 until the scraper bar 62 rests on the floor 16. The tractor 18 is then caused to move, with the power take-off engaged, to propel the device 10 over the floor of the poultry rearing area. As the device 10 is moved over the floor, the scraper bar 62 scrapes up the layer 14 of caked organic material and directs it into the device 10. The organic material is pulverized and mixed by the flail elements 80 as they are rotated on the rotating shaft. As the device 10 progresses, the pulverized and mixed mateerial is evenly deposited back on the floor.

It can be appreciated that as additional floor covering material is added to the floor 16, the depth of the layer of material or litter 14 increases. Moreover, after several flocks of poultry have been raised, the depth of the litter will be increased from the additional feathers and the like. The device 10 having flail elements 80 having lengths of 10 inches or greater is capable of handling this increase in organic material depth. In contrast, the devices of the prior art must be operated in a raised position due to the use of shorter flail elements and, as a result, tend to scatter large chunks of somewhat conditioned floor covering material unevenly over the floor 16.

Further, it can be appreciated that the organic material to be reconditioned contains a high quantity of feathers and lint mixed with the material which has a high moisture content. This organic material can build up on any surface that passes through it. However, because the flail elements 80 comprise straight steel bars preferably having a width of three-eights of an inch, the flail elements are self-cleaning as they rotate, i.e., the organic material does not cake the flail elements 80. This is a great advance over the prior devices. In contrast, the flail elements of the prior art include flat hammer heads at ends thereof. These flat hammer heads tend to cake up and require relatively frequent cleaning resulting in more downtime for the device.

The deflector panel 40, being hinged at the top, is of sufficient opening size to allow varying depths of material to pass through to be evenly deposited on the floor 16. The normal vertical position of the deflector panel 40 prevents material from being thrown into the air and thus creating a hazard. Moreover, the vertical length of the panel 40 is longer than those of the prior art.

It can be appreciated that the bulk of the working area of the device 10 is extended to the right of the tractor center line to allow working of material along the outside of the floor 16 and close to the perimeter of the footing of nearby vertical side wall support members. To this end, the angle raker panel 170 provides additional scraping and direction of the material into the device 10.

It can also be appreciated that the contoured bed panel 52 follows the swing circumference of the arc scribed by the ends of the flail elements 80 with sufficient clearance to prevent actual metal-to-metal contact. This arc continues for approximately 40 degrees. The contoured bed portion 53 ensures that the organic material to be reconditioned is thoroughly pulverized and mixed before being expelled to the rear of the device 10. This is a vast improvement over the prior art devices in which the material to be reconditioned falls to the floor after being contacted by the flail elements only once.

While a preferred embodiment has been shown, modifications and changes may become apparent to those skilled in the art which shall fall within the spirit and scope of the invention. It is intended that such modifications and changes be covered by the attached claims.

I claim:

1. An apparatus for conditioning the floor of a poultry rearing area having a layer of material to be conditioned covering said floor, comprising:
   (a) a housing having left and right bottom end walls attached to left and right longitudinal frame bar members and adapted to be moved across the floor, a contoured bed attached to bottom edges of said end walls and having an arcuate concave section extending through an arcuate curve of approximately 40°,
   a forwardly slanting plate member extending between said end walls and forming an inlet area for said contoured bed, but terminating at its free edge short of the floor surface,
   a scraper blade attached to the top surface of said forwardly slanting plate and extending beyond said free edge to the elevation of the floor, whereby material scraped from the floor is directed into the inlet area of the contoured bed;
   (b) conditioning means in said housing for conditioning said material and including a rotatable shaft member extending between said end walls and having a plurality of flail elements pivotally mounted on a surface thereof, said flail elements being sized and pivotally hinged to have the ends thereof closely spaced to said arcuate concave section of said contoured bed positioned beneath said shaft member and having an arcuate path that follows an arc scribed by said flail elements in close adjacency thereto, as said shaft rotates;
   (c) means adapted for driving said shaft member connected to said shaft member; and
   (d) vertical deflector panel means hingedly mounted on said housing for deflecting material discharged from the contoured bed and forming an outlet with the rear portion of the contoured bed for reconditioned material evenly on the floor.

2. An apparatus as set forth in claim 1, wherein said flail elements comprise straight bars having a length of about 10 inches or greater.

3. An apparatus as set forth in claim 2, wherein said flail elements have a cross-sectional dimension of about ⅜ inches.

4. An apparatus as set forth in claim 1, wherein said rotatable shaft member is positioned transversely to the path of travel of the housing.

5. An apparatus for conditioning the floor of a poultry rearing area as defined in claim 1, wherein drive means are provided adapted for driving said rotatable shaft member including a sprocket and chain assembly having one sprocket connected to an end of said rotatable shaft member.

6. An apparatus as set forth in claim 5, wherein said drive means sprocket and chain assembly further includes a right angle gear box adapted to be connected to a power take-off of a tractor and to a second sprocket of the sprocket and chain assembly.

7. An apparatus as set forth in claim 6, wherein said right angle gear box is graded at 50 hp.

8. An apparatus for conditioning the floor of a poultry rearing area as defined in claim 1, wherein said housing further includes a hinged top cover member that is adapted to be opened and closed to provide access to the interior of the housing.

9. An apparatus as set forth in claim 8, wherein said top cover member has a semi-cylindrical shape.

10. An apparatus as set forth in claim 9, wherein said housing further includes a pair of steel plates mounted beneath said housing and in contact with said floor, said steel plates having a floatation surface of at least 64 square inches each to thereby minimize damage to the floor and to minimize wear on said scraper means.

11. An apparatus for conditioning the floor of a poultry rearing area as defined in claim 1, wherein angle raker means are attached along and project from a side of said housing and are adapted for scraping material from said floor and for directing said material into said inlet.

12. An apparatus as set forth in claim 11, wherein said angle raker includes a vertically-oriented panel member.

13. An apparatus as set forth in claim 12, wherein said angle raker panel includes a curved leading edge that prevents said angle raker means from hanging up on vertical walls of nearby structures.

14. A method of conditioning litter on the floor of a poultry rearing area for reuse, comprising the steps of:
  scraping and directing litter from a horizontal floor surface into a housing;
  rotatably driving a shaft having a plurality of flail elements pivotally connected about a surface thereof so that the flail elements prescribe a circular path varying in diametric extent from a minimum to a maximum within the limits of the pivotal connection;
  confining said litter within said housing with an arcuate surface in closely spaced adjacency to said flails at approximately the maximum of said circular path and for at least 40° of arc thereby to provide a time sufficient to ensure complete pulverizing, mixing, and fluffing of the litter; and
  discharging the conditioned litter onto the floor of the poultry rearing area.

15. The method of claim 14, further including the step of raking extra litter from laterally outside the path of travel of said housing by means of a projecting rake and directing said litter into said housing.

16. A method as set forth in claim 15, including the step of rotatably driving said shaft by means of a sprocket and chain assembly interposed between the shaft and the power take-off of a tractor.

17. An apparatus for conditioning the floor of a poultry rearing area having a layer of material to be conditioned covering said floor, comprising:
  (a) a housing adapted to be moved across the floor having an inlet into which said material is introduced and an outlet from which conditioned material is discharged, said housing also including a top cover hingedly attached along a top portion of said housing to permit access into the interior of the housing;
  (b) conditioning means for conditioning said material mounted within said housing and including a rotatable shaft member having a plurality of flail elements pivotally mounted on a surface thereof and a contoured floor panel member positioned beneath said shaft, said floor panel member having an arcuate section that follows an arc scribed by said flail elements as said shaft rotates;
  (c) means adapted for driving said shaft including a chain and sprocket assembly having a sprocket attached to one end of the shaft member;
  (d) scraper means mounted on said housing for scraping said material from said floor and for directing said material into said inlet; and
  (e) angle raker means mounted on a side of said housing for scraping extra material not in the path of travel of said housing and directing said extra material into said housing.

18. An apparatus as set forth in claim 17, wherein said flail elements comprise straight bars having a length of 10 inches or greater.

* * * * *